US010997359B2

(12) United States Patent
Rincon Opden Bosch et al.

(10) Patent No.: US 10,997,359 B2
(45) Date of Patent: May 4, 2021

(54) REAL-TIME COGNITIVE MODIFYING A MARK-UP LANGUAGE DOCUMENT

(71) Applicant: International Business Machines Corporation, Armonk, NY (US)

(72) Inventors: Andres Felipe Rincon Opden Bosch, Bogota (CO); Rodrigo Ryu Nakamura Sano, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 15/964,238

(22) Filed: Apr. 27, 2018

(65) Prior Publication Data

US 2019/0332647 A1    Oct. 31, 2019

(51) Int. Cl.
*G06F 40/14* (2020.01)
*H04L 12/58* (2006.01)
(Continued)

(52) U.S. Cl.
CPC ............ *G06F 40/14* (2020.01); *G06F 40/154* (2020.01); *G06N 20/00* (2019.01); *G10L 15/26* (2013.01); *H04L 51/02* (2013.01)

(58) Field of Classification Search
CPC .... G06F 16/243; G06F 16/245; G06F 16/248; G06F 16/287; G06F 16/332; G06F 16/3328; G06F 16/438; G06F 16/732; G06F 16/3344; G06F 16/3334; G06F 16/3331; G06F 16/3329; G06F 16/953; G06F 16/9532; G06F 16/9032; G06F 16/9538;
(Continued)

(56) References Cited

U.S. PATENT DOCUMENTS 6,385,583 B1    5/2002 Ladd et al.
6,539,359 B1    3/2003 Ladd et al.
(Continued)

OTHER PUBLICATIONS

Michiels, Eric. "Modelling Chatbots with a Cognitive System Allows for a Differentiating User Experience." PoEM Doctoral Consortium (2017), pp. 1-8. (Year: 2017).*
(Continued)

*Primary Examiner* — Ariel Mercado
(74) *Attorney, Agent, or Firm* — Scully, Scott, Murphy & Presser, P.C.; Alexander Jochym, Esq.

(57) ABSTRACT

A cognitive computer system and method for managing a mark-up language document by a cognitive conversational agent. The computer-implemented method comprises: receiving text input associated with a conversation initiated by a user via a remote device interface; generating a set of variables associated with a context of the user based on a conversation flow; identifying a data use intent of the user based on the set of variables and the context; determining based on the identified data use intent, a required visualization of data; in response to determining a required visualization of data, obtaining a relevant data or information to be visualized; generating a visualization object containing the relevant data and visualization information; modifying in real time, a mark-up language based document using the visualization object; and transmitting the markup language based document including the visualization object for display via the remote device interface.

17 Claims, 12 Drawing Sheets

(51) Int. Cl.
  *G06F 16/332* (2019.01)
  *G06N 20/00* (2019.01)
  *G06F 40/154* (2020.01)
  *G10L 15/26* (2006.01)
(58) Field of Classification Search
  CPC ........... G06F 16/9038; G06F 16/90332; G06F 16/90335; G06F 16/24575; G10L 15/00; G10L 15/22; G10L 15/183; G10L 15/1815; G10L 15/1822; G10L 21/10; G06N 20/00
  See application file for complete search history.

(56) References Cited

U.S. PATENT DOCUMENTS

| | | | |
|---|---|---|---|
| 6,944,594 B2 | 9/2005 | Busayapongchai et al. | |
| 7,917,367 B2 | 3/2011 | Di Cristo et al. | |
| 7,949,530 B2 | 5/2011 | Huang et al. | |
| 10,366,151 B1* | 7/2019 | Mertens | G06F 3/0481 |
| 2013/0103677 A1 | 4/2013 | Chakra et al. | |
| 2013/0282696 A1 | 10/2013 | John et al. | |
| 2013/0346302 A1* | 12/2013 | Purves | G06Q 20/108 |
| | | | 705/40 |
| 2014/0218372 A1* | 8/2014 | Missig | G06F 3/04883 |
| | | | 345/473 |
| 2015/0006518 A1 | 1/2015 | Baumgartner et al. | |
| 2015/0205772 A1 | 7/2015 | Leventhal | |
| 2015/0364132 A1 | 12/2015 | Goussard et al. | |
| 2016/0179877 A1* | 6/2016 | Koerner | G06F 16/243 |
| | | | 707/721 |
| 2017/0330195 A1* | 11/2017 | Lange | G06F 3/0486 |
| 2018/0183737 A1* | 6/2018 | Subbarayan | H04L 51/32 |
| 2018/0210883 A1* | 7/2018 | Ang | G06F 17/277 |
| 2018/0232376 A1* | 8/2018 | Zhu | G06F 40/35 |
| 2019/0005023 A1* | 1/2019 | Olsen | G06F 40/134 |
| 2019/0102390 A1* | 4/2019 | Antunes | G06F 16/9038 |

OTHER PUBLICATIONS

Marietto, Maria & Aguiar, Rafael & Barbosa, Gislene & Botelho, Wagner & Pimentel, Edson & Franca, Robson & Silva, Vera. "Artificial Intelligence MArkup Language: A Brief Tutorial" International Journal of Computer Science and Engineering Survey, Jul. 2013, pp. 1-19. (Year: 2013).*

Mengting Yan, Paul Castro, Perry Cheng, and Vatche Ishakian. "Building a Chatbot with Serverless Computing", In Proceedings of the 1st International Workshop on Mashups of Things and APIs (MOTA '16). Association for Computing Machinery, New York, NY, USA, pp. 1-4. (Year: 2016).*

* cited by examiner

REAL-TIME COGNITIVE MODIFYING A MARK-UP LANGUAGE DOCUMENT

BACKGROUND

The present invention generally relates to computer systems, platforms or engines implementing machine learning techniques to provide, via a device interface, a system and method for controlling a flow and dissemination of a web-based or mark-up language document based on user context.

BACKGROUND

Currently, nearly every enterprise or company is dealing with a large amount of inconsistently defined data that sits in multiple different systems around the organizations. Consequently, the speed with which leaders can access their information has become critical in today increasingly data-driven economy. However, a problem exists in the sense that much time may elapse before all relevant information needed is in place before a decision maker can make an important informed decision.

SUMMARY

One embodiment of the present invention is a system, method and computer program product providing a computer or Smartphone with an ability to expedite the obtaining and formatting of relevant pieces of information in one place such that a decision maker can make more expedient decisions.

In one aspect, a cognitive computer system implements a method for dynamically modifying a document for rendering information in a format in accordance with a context associated with a user. After locating references, a cognitive conversational agent determines need to reformat the document and performs a document reformatting for rendering information in a document as per a determined context/requirement of a user.

According to one embodiment, there is provided a computer-implemented method for managing a mark-up language document in real-time. The method comprises: receiving, at a control processor, text input associated with a conversation initiated by a user via a remote device interface; generating, using the control processor, a set of variables associated with a context of the user based on a conversation flow; identifying, using the control processor, a data use intent of the user based on the set of variables and the context; determining, using the control processor, based on the identified data use intent, a required visualization of data; in response to determining a required visualization of data, the control processor obtaining a relevant data or information to be visualized; generating, by the control processor, a visualization object containing the relevant data and visualization information; modifying, by the control processor, in real time, a mark-up language based document using the visualization object; and transmitting the markup language based document including the visualization object for display via the remote device interface.

In a further embodiment, there is provided a cognitive computer system for managing a mark-up language document in real-time. the computer system comprises: a memory storage system storing program instructions; and a control processor for running the stored instructions to configure the control processor to: receive text input associated with a conversation initiated by a user via a remote device interface; generate a set of variables associated with a context of the user based on a conversation flow; identify a data use intent of the user based on the set of variables and the context; determine based on the identified data use intent, a required visualization of data; in response to determining a required visualization of data, obtain a relevant data or information to be visualized; generate a visualization object containing the relevant data and visualization information; modify, in real time, a mark-up language based document using the visualization object; and transmit the markup language based document including the visualization object for display via the remote device interface.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE DRAWINGS

Objects, features, and advantages of the present disclosure will become more clearly apparent when the following description is taken in conjunction with the accompanying drawings, in which.

DETAILED DESCRIPTION

Figure 1:
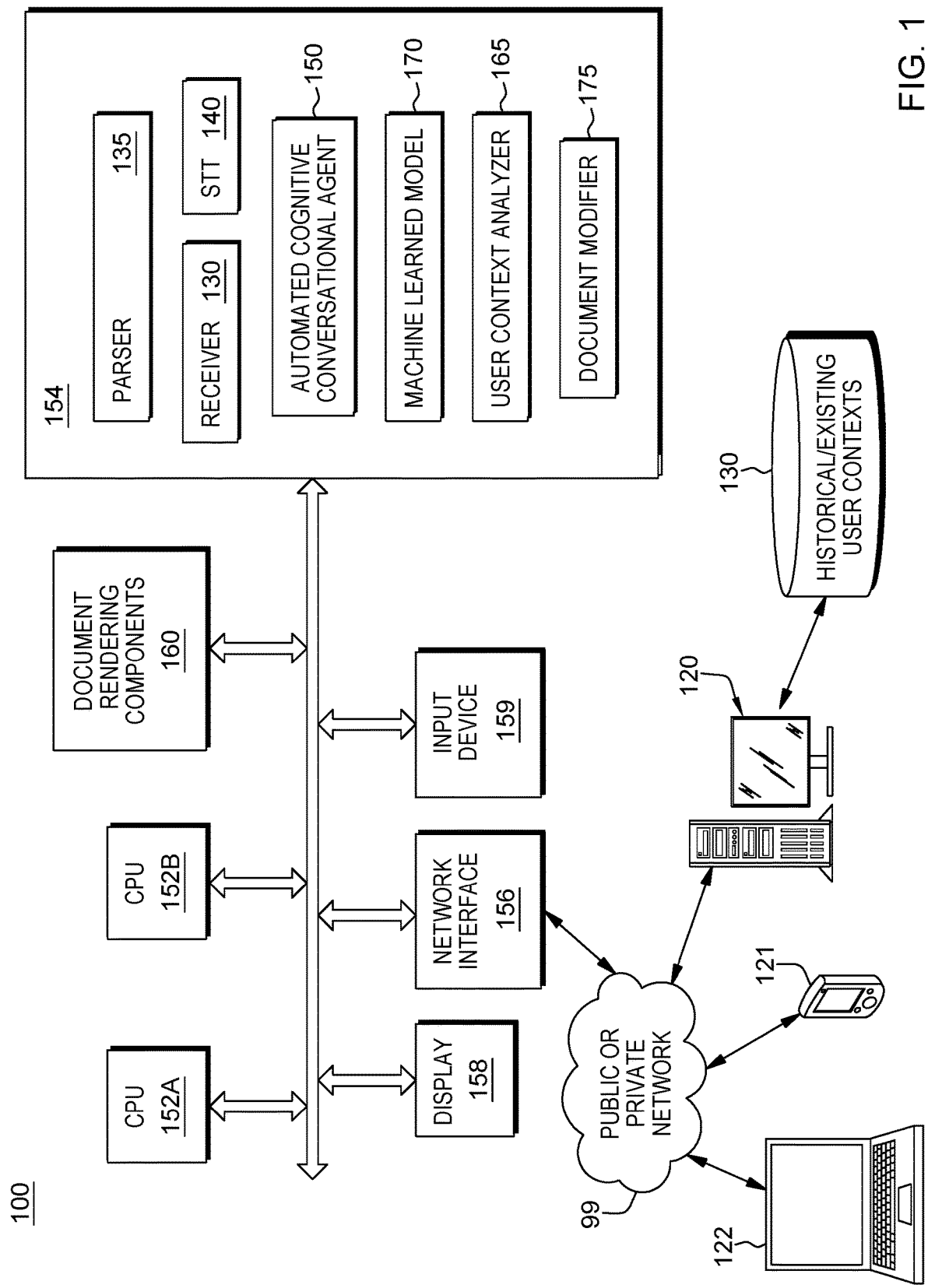
FIG. 1 conceptually depicts a system architecture within which a cognitive conversational agent is employed in one embodiment.

A computer system, methods and computer program products configuring a computer to implement cognitive conversational agent for controlling the receipt, formatting, and content selection of a web-based document for presentation to a user, based on that user's context.

In one embodiment, the computer provides a cognitive solution for enabling the user to interact in a Natural Language with an Automated Conversational Agent in order to mutate in real time the markup language and style sheets of a World Wide Web document to provide compelling, opportune and appropriate information to the end user that includes but is not limited to: text general information (actuals, predictions), Tables, Links Visualizations, Dashboards, Webpage previews.

As will be referred to herein, a "document" refers to a mark-up language web page loadable in a computer browser application that may be HTML, XML<SVG, or other document types. In one aspect, a markup language document is built under the Document Object Model (DOM) which is a concept built around the idea of elements, e.g., the "head" (<head></head>) of the document and the "body" (<body></body>) of the document. Each of those might have they own subsets of elements; for example bold text (<b></b>), italics text (<i></i>), links (<a href=></>), headings (<h1></h1>), ordered list (<ol></ol>), unordered list (<ul></ul>, etc. These elements are then taken by the different browsers as instructions for rendering those elements in a display interface screen.

As will be referred to herein, a "component" may represent one or more elements grouped together for a specific purpose. For example, a component that is only for rendering a link to another webpage, that component would be composed of three DOM tags "<br><a href="*"></><br>", where the asterisk would be a variable that can be changed before or after rendering by a controller. A more complex component would have all the relevant DOM tags to show on screen one or more charts and some text variables. To decompose a more complex component in markup language, for example, there may be obtained a plurality DOM tags.

In one aspect, components such as a grouping of DOM tags may be prefabricated based on a user's needs. For example, if an end user desires current news information, there may be persisted a component that is created to best represent news content visually. Same with a table, a map, an interactive chart or even plain information. That is, components may be prefabricated to best represent a data table, a map, an interactive chart or even plain text information.

In further embodiments, components may include visualization objects that contain data that is designed to produce a visualization. These may include graphic objects that may include the basic drawable elements graphics system, and may be a container for other objects. Visualization objects may be combined or added to further objects, e.g., to control a visualization of other objects it contains. Visualization objects may include a sub-category of attribute objects that define the appearance of a visualization object, e.g., a font object controlling the FONT property of the text object and defines the type characteristics of the text. Attribute objects are instances of a plurality software display object classes.

Figure 4:
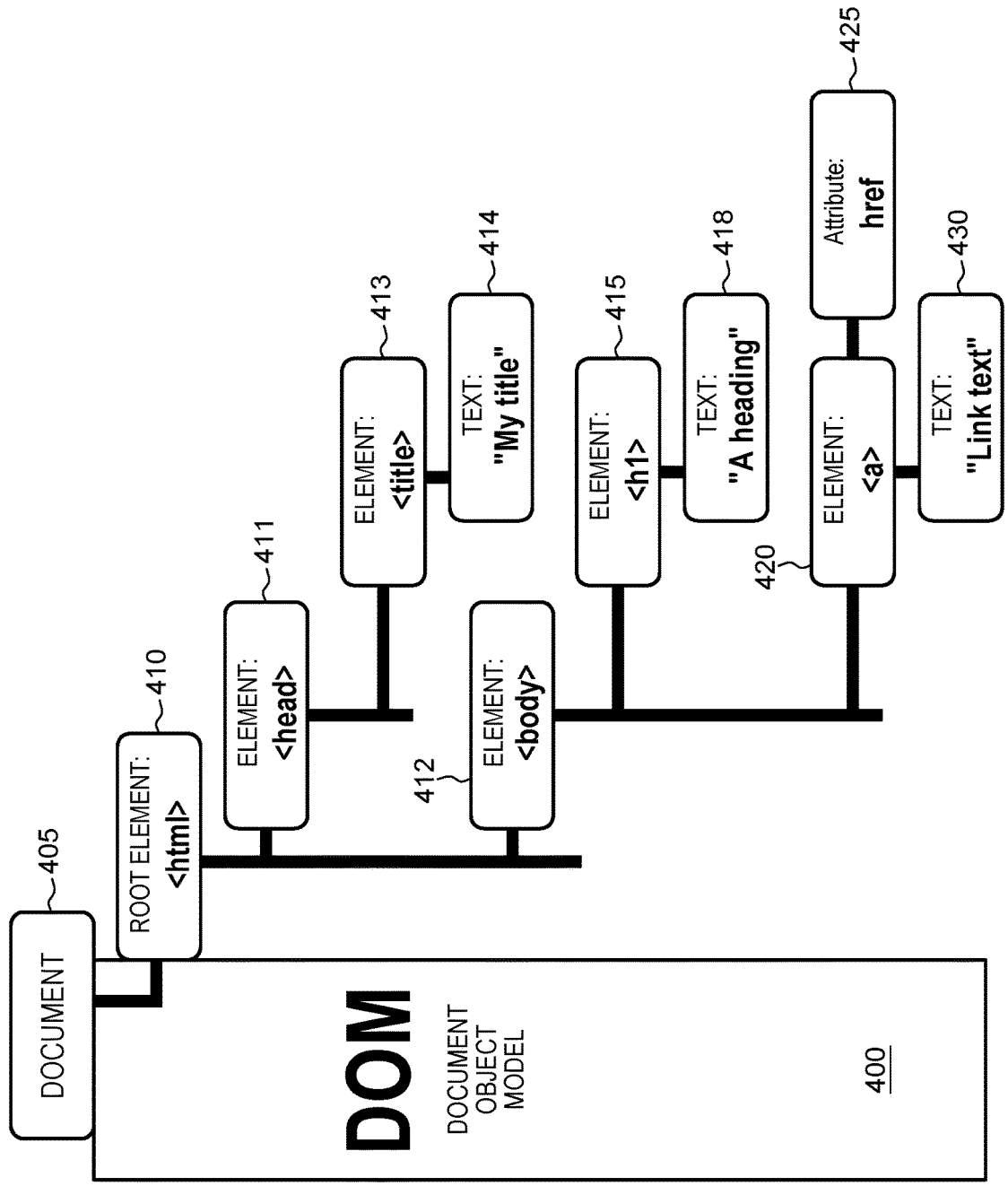
FIG. 4 depicts a high-level DOM model implemented to understand markup documents, and indicates to the end user browser what and how to render a document in one embodiment.

In one embodiment, as shown in FIG. 4, the DOM is a known internal model 400 implemented to understand markup documents, and which indicates to the end user browser what and how to render a document 405 for presentation on a screen. Such DOM components or tags may be implemented for rendering the document, as shown in FIG. 4, according to a hierarchy including: a first <html> root element tag 410 having two-sub-elements: <head> tag element 411 and <body> tag element 412. In an example as shown, the head element 411 may include further tags such as a <title> tag element 413 for rendering received text 414; similarly, the body element 412 may include further tags such as a header tag <h1> 415 for rendering header text information 418, and an anchor tag <a> element 420 and an associated link attribute "href" 425 which attribute specifies the URL of the page the link goes to; and receiving an associated hyper link text 430.

FIG. 1 conceptually depicts a system architecture 100 within which a cognitive conversational agent is employed. In one embodiment, system architecture 100 includes a client-server based communications system architecture for receiving requests for data or information, e.g., from calls or messages, as initiated from a sender device(s) over a communications network.

In one embodiment, a real-time conversational agent is a computer system 100 such as a computing device, a mobile device, or a server. In some aspects, computing device 100 may include, for example, personal computers, laptops, tablets, smart devices, smart phones, or any other similar computing device.

Computing system 100 includes one or more processors 152A, 152B, a memory 154, e.g., for storing an operating system and program instructions, a network interface 156, a display device 158, an input device 159, and any other features common to a computing device. In some aspects, computing system 100 may, for example, be any computing device that is configurable to communicate with a web- or cloud-based server 120, or with other end user computing devices 122 and pervasive digital devices, e.g., mobile phones, Smartphones 121, and the like, over a public or private communications network 99. Further, as shown as part of system 100, data or components such as DOM tags providing for mutating a markup document may be temporarily stored locally in a coupled or attached memory storage device 160, or otherwise, may be stored in a remote memory storage device 130, e.g., a database, and accessed via a remote network connection for input to the system 100. In one embodiment, such memory storage device 130 may include a private databases or a third party database or public databases exposed through an Application Programming Interface (API).

In the embodiment depicted in FIG. 1, processor 152A, 152B may include, for example, a microcontroller, Field Programmable Gate Array (FPGA), or any other processor that is configured to perform various operations. Processors 152A, 152B may be configured to execute instructions as described below. These instructions may be stored, for example, as programmed modules in memory storage device 154.

Memory 154 may include, for example, non-transitory computer readable media in the form of volatile memory, such as random access memory (RAM) and/or cache memory or others. Memory 154 may include, for example, other removable/non-removable, volatile/non-volatile storage media. By way of non-limiting examples only, memory 154 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 156 is configured to transmit and receive data or information to and from a server 120, or a web-based server running a social media web-site, via wired and/or wireless connections. For example, network interface 156 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 100 to transmit information to or receive information from the server 120.

Display 158 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 158 may include a liquid crystal display (LCD), an e-paper/e-ink display, an organic LED (OLED) display, or other similar display technologies. In some aspects, display 158 may be touch-sensitive and may also function as an input device.

Input device 159 may include, for example, a keyboard, a mouse, a touch-sensitive display, a keypad, a microphone, or other similar input devices or any other input devices that may be used alone or together to provide a user with the capability to interact with an augmented reality computing environment and virtual reality computing environment generated at the computing device 100.

In one embodiment, programmed processing modules stored in a device memory 154 provide the system with abilities an automated conversational agent to generate a new document or reformat an existing document for rendering information in a document in a graphic format (e.g., a chart) and/or textual format as per a context/requirement of a user.

As shown in FIG. 1, in one embodiment, a receiver element 130 is a module configured to receive a request for a web-page document, and in response, may invoke services of an Automated Conversational Agent (ACA) module 150 programmed to receive and process the user's request.

In particular, the ACA 150 functions as a server side listener module that receives input requests, e.g., messages, from user end user devices, and automatically generates, on the fly, any significant variables, intent and user context. In one embodiment, the ACA 150 provides an output based on the input that is received from the source (requestor) and the significant variables, intent and user context. In one embodiment, the ACA may provide a user output responsive to a user hitting an "enter" button via that user's keyboard interface or hits a "send" button via the user's device interface, which sends the server system 100 a request, e.g., in the form of a text or other message format, for a mark-up language document.

As further shown in FIG. 1, in one embodiment, the ACA module 150 may invoke services of a natural language parser device 135, for parsing the contents of the text of the received user request and/or parsing metadata information associated with the received request.

In one embodiment, parser module 135 parses the received text to look for matching keywords which determines a relevance. Specific combination of words creates "intent" relevance, and specific word matches creates "entity" relevance. When the relevance of a specific keyword passes certain threshold it is then assigned to the entity as a variable value. For example, identified keywords such as a company or enterprise name or business unit name may be automatically recognized and variable entity created; other keywords may be easily matched and corresponding variables may easily be formed, e.g., geography or geographic regions. These variables are then stored during the current user session as complementary information (or metadata) referred to as "context". Based on a combination of these components the server side listener will give out an output that includes the response to the user and also metadata that contains the values of all of these components.

As further shown in FIG. 1, one program module stored in a device memory 154 may include a speech to text converter module 140 that when run by a processor device, configures the system to obtain and process audio signal information from a spoken voice of the end user and convert it to text such that a context of the requestor may be determined. In one embodiment, the module 140 implements IBM® Watson® real time speech recognition technology and functionality to transcribe audio conversation into textual information for quick understanding of the content.

As further shown in FIG. 1, one program module stored in a device memory 154 may include context analyzer module 165 that when run by a processor device, configures the system to obtain and process the data relating to: the requestor inputs, any corresponding variables that have been stored during the current user session as complementary information (or metadata) relating to requestor context or intent, and gather any preferences associated with the history of past requests and corresponding contexts from this requestor. From past historical data, the system analyzer obtains any mapping any preferred web document formats that may have been requested by that user in association with that user's past context. A supervised machine learning algorithm may be run to correlate these variables of user context of a requesting session and corresponding web formats for that user and other users, and build a machine learned model 170.

In one embodiment, this model 170 may be instructed by the ACA 150 to receive new word inputs from a current user conversation/session for a current user requesting web content, and receive as input any determined context (intent) based on the conversation resulting from parsing, keyword matching, and variables generating, and provide, as model outputs, a recommended format for presenting the requested content returned to the user for visualization on that user's web browser. In one embodiment, International Business Machine's Watson™ Discovery service may be employed to build a cognitive, cloud-based model to perform multiple queries including boolean, filter and aggregation to discover patterns, trends and obtain actionable insights hidden in the user conversations or sessions data for a current user.

Figure 7:
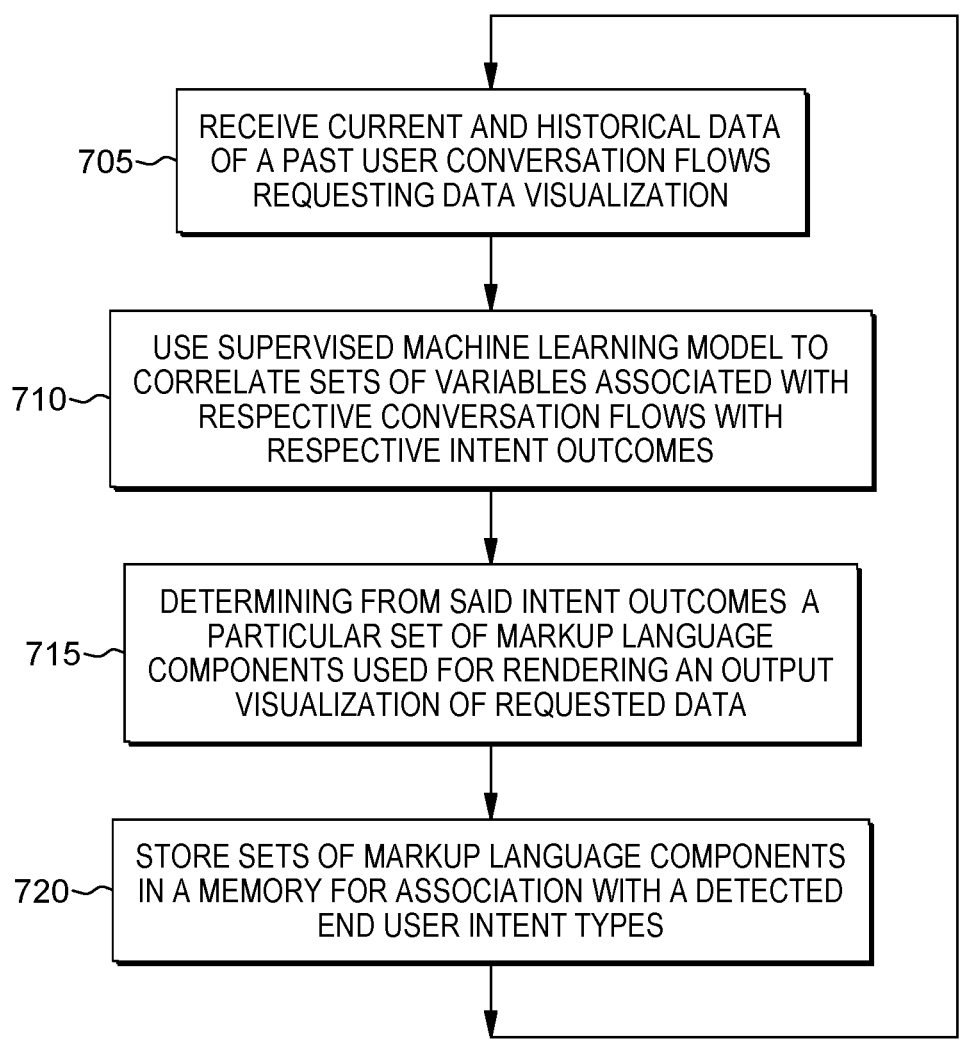
FIG. 7 depicts an embodiment of a method run by the ACA module to generate and continually revise types of intents and related visualization components outputs based on conversation flow variables generated by end user conversation inputs.

FIG. 7 depicts an embodiment of a method 700 run by the ACA module 150 to generate and continually revise types of intents and related visualization components outputs based on conversation flow variables generated by user conversation inputs.

As shown in FIG. 7, step 705, the system 100 receives current and historical data of a past user conversation flows requesting data visualization. In particular, the series of variables associated with the past conversation flows are received as input to a machine learning model. At 710, a supervised machine learning technique is implemented to build a machine learned model for correlating a series of variables associated with respective conversation flow with a respective intent and corresponding visualization outcomes as requested by past/current end users. At 715, the model determines for each determined intent outcomes a particular set of markup language components used for rendering an output visualization of associated requested data. At 720, these sets of markup language components are stored in a pool of components for later association with a data request visualization in a markup document according to a detected intent of a current end user.

Figure 6:
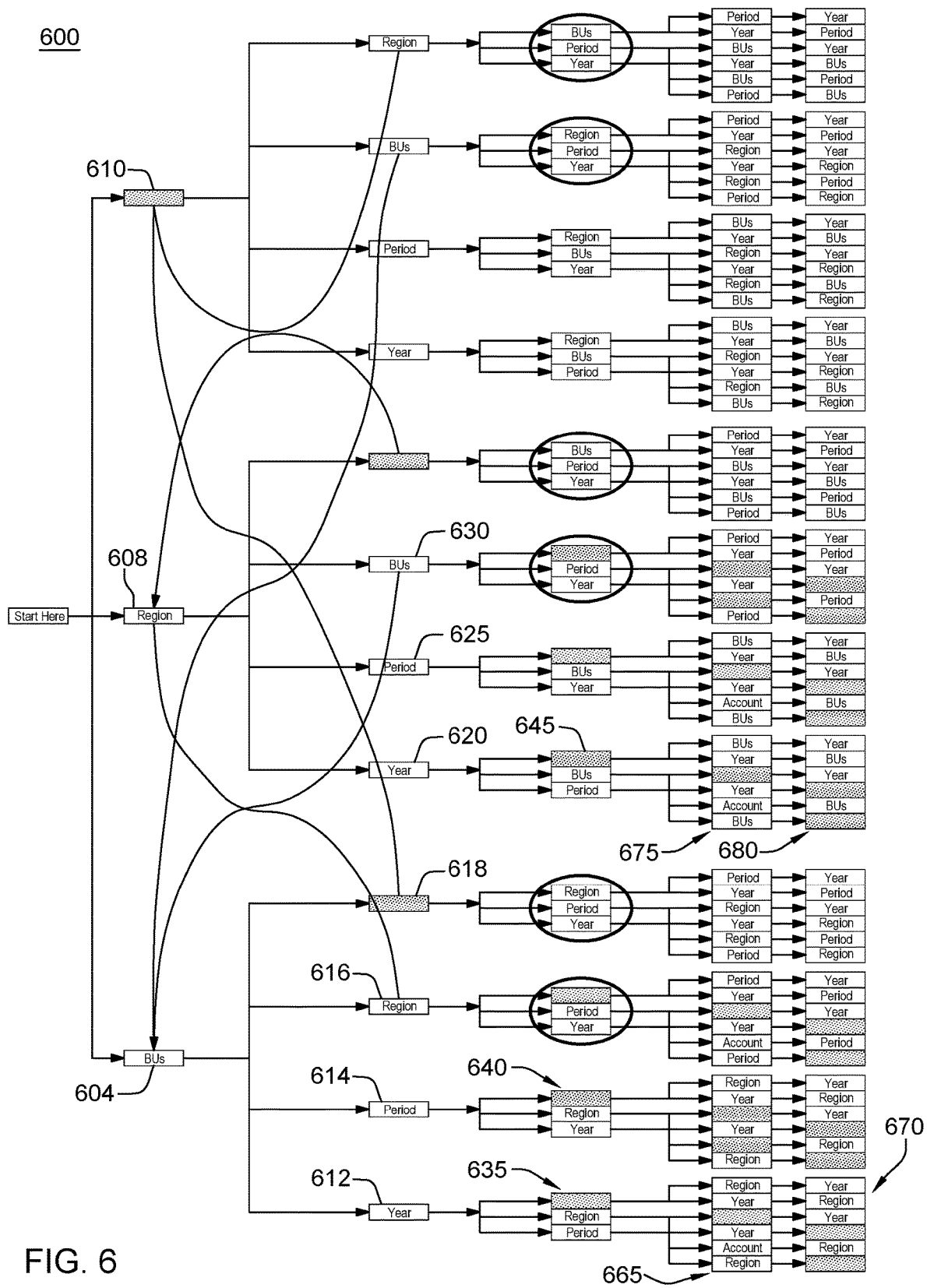
FIG. 6 is a neural network depiction of conversation combinations in accordance with an embodiment of the present invention.

In one embodiment, the machine learned model 170 may include a trained neural network of topics and would embody all the possible combinations of the conversation based on the intended use for the ACA module. FIG. 6 shows a depiction of a neural network 600 modeling conversation combinations, each conversation represented as an interconnection of plural variables that have been generated in association with an intended data usage. As an example, the neural network 600 depicts combinations of past received conversations, e.g., showing a model of conversation flows and requests by users over time. Inputs to the model are conversation flows requesting dashboard or business intelligence information from stored information of domains such as business units 604, regions 608 or beginning at any other modeled parameter input 610. All conversations and input requests accumulate and over time, the system develops a list of combinations for each of domain. For example, for a particular Business Units domain entity variable 604, there may have been further requests made with respect to a particular year variable 612, a time period variable 614, a region variable 616, or with respect to any other modeled parameter variable 618. Likewise, for the regions domain 608, there may have been further visualization requests made with respect to a particular year variable 620, a time period variable 625 or a business unit entity variable 630. Any other parameter 618 that may have been associated with a conversation flow made with respect to particular a years, time period, business unit, or region. In one embodiment, the neural network model learns behavior of past conversation inputs (context) and can present a particular type of markup language document for appropriate end user presentation. The neural network model 600 may learn conversation flow behavior from multiple conversations involving multiple request detail levels. For example, for a particular business unit entity 604 and particular year 612 further conversation flow requests may have been received to drill down and receive more information 635 pertaining to a particular region, period or any other parameter. Further, from these, the network may model further combinations 665 pertaining to past user requests and from these even further combinations associating further details 670 may be modeled. Likewise, for a particular region 608 and particular year 620 further requests may have been received to drill down and receive more information 645 pertaining to a particular business unit, period or any other parameter. Further, from these, the network may model further combinations 675 pertaining to past user requests and from these even further combinations associating further details 680 may be modeled.

As further shown in FIG. 1, one program module stored in a device memory 154 may include a document modifier module 175 which may be programmed to modify a pre-formatted web document having requested content that the system returns to the requestor. The document modifier retrieves the requested content and based on model outputs, format the requested content for the user in a form most suited for the user's web browser modality and current context.

The resulting web document formatted according to the model outputs based on a current detected user context is then transmitted back to the requestors computer device and formatted appropriately for receipt at the device web browser.

In one embodiment, this model 170 may be updated and revised for that user based on subsequent requests by that user, detected contexts associated with conversational inputs, and resulting web document formats that were returned back to the user that were correlated by the model.

In one embodiment, this model 170 may be updated and revised based on subsequent requests by other users or requestors, and their corresponding contexts associated with their respective conversational inputs, and resulting web document formats that were correlated using the model.

Figure 2:
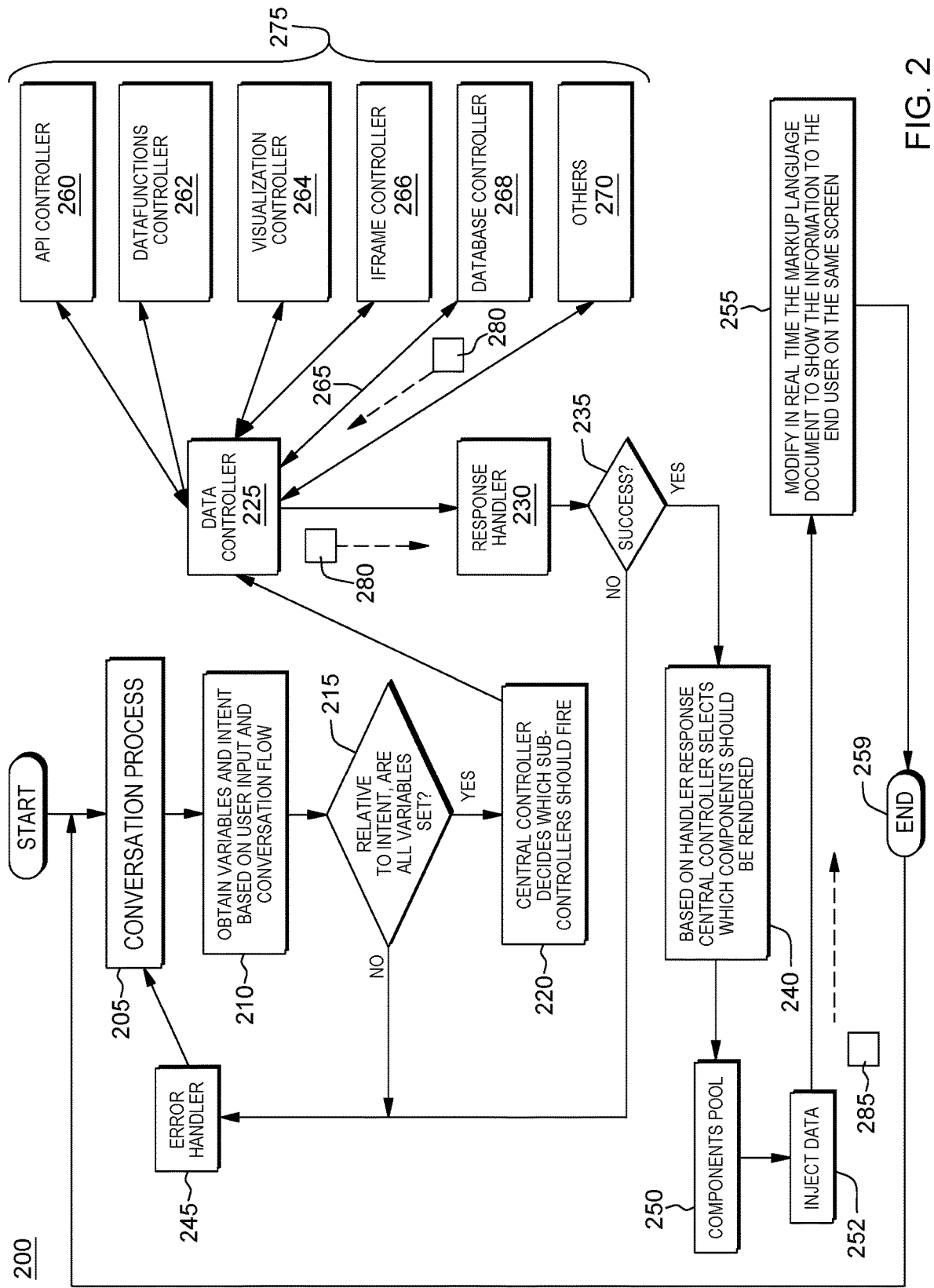
FIG. 2 depicts one embodiment of a method implemented by the automated conversational agent (ACA) controller of system of FIG. 1.

FIG. 2 depicts one embodiment of a method implemented by the automated conversational agent 150 of system 100. As shown at 205, in real time, the system 100 receives user requests through a conversational agent interface with which the user interacts with though a web-browser on an end user device 121, 122. For example, a user may enter textual request and/or information via the ACA interface at the end user device which is received, parsed and key words identified and extracted from the conversational flow at 205. Then, at 210, FIG. 2, is user and determines an intent from the variables created. In one embodiment, system 100 context analyzer may perform the keyword matching of the words extracted from the conversation to determine their relevance. These words and their relevance form the basis of detecting an intent and generating of variables that are stored in a memory during the current user session as complementary information. At 210, the ACA generates the intent and the variables by matching extracted keywords which determines a relevance. The system detects specific combination of words from which an "intent" relevance is determined. Further, specific word matches may be used to create an "entity" relevance. When the relevance of a specific keyword passes certain threshold it is then assigned to the entity as a variable value.

In one embodiment, the system defines variables (entities) and defines purposes (intents). Intents are defined through combination of words and a relevance index, e.g., the higher index result is the one taken as the actual intent. For example, if an end user wants to know the exchange rate for a specific currency. He might word his inquiry as follows:
"Can you provide currency information?" or
"please tell me about the exchange rate for the brazilian real" or
"Do you know the exchange rate between USD and EUR?", and the like.

Now let's say that he wants financial results, he might word it like this:
"Please tell me the revenue for the company in 1Q" or
"Can you provide financial results?" or
"Do you know the Gross Profit that we had in the main business unit?"

Based on those examples, there would be created an index model according to the occurrence of keywords and common words. Between two different inquiries common words might be identical and the only difference is a keyword, so keywords are given more relevance in the model but common words have their place in the model to define intents.

Entities are specific word matches in an array of data. So the administrator might define an array of data called "Geography" as [US, Brazil, Colombia, Spain, Italy, Germany, Japan]. So in a conversational input the user might say "Please give me the data for Spain", the server will parse that input and define that the Geography entity equals to Spain.

Continuing to step 215 a determination is made as to the extent of the relevance of the key words extracted from the conversational flow, and particularly, relevant to intent, whether all the variables have been set (i.e., have a value). If the ACA at 210 does determine that there is not enough information to determine a user intent or context, then the method proceeds to step 245, where an error handler element 245 is invoked to modify the conversation flow and in particular automatically generate a query to elicit more information from the end user from which additional context and corresponding relevance variables for that intent may be determined. The steps of 205, 210 and 215 are repeated until such time as the system has determined a context and an intent and to ensure relevant variables have been determined. In one embodiment the variables set at 210 are used to determine the relevant processing engines required for use in obtaining information for modifying the mark-up language document.

Generally, the amount and types of variables are predetermined or predefined based on the different types of intent. In one example, a determined "intent" from conversation input may be "financial results" for a particular company, and accordingly the system 100 knows that such an intent requires several variables populated in order to generate financial results for the end user. The variables for "financial results" intent may be predefined may include, e.g., an account, a revenue type, e.g., gross profit, a geography, a year, a business unit, etc. In parallel, the data controller fires different controllers and obtains the data associated with each variable and the system transforms the data to provide visualization of the financial results for the end user.

Returning to step 215, FIG. 2 if it is determined that relevant to intent, all the variables that make up a conversation flow have been set (i.e., have a value) for that determined intent, then the method proceeds to 220, where the ACA configures the system 100 as a data controller 225 to determine which sub-processing control engines (e.g., processes) should be activated to provide the content needed to satisfy the user request for that session. Each of these sub-processing engines will perform a very specific task and pass-through data between each other based on ACA controller instructions.

FIG. 2 depicts the functionality of the data controller 225 that in real time, in one embodiment, functions as a central hub to provide or relay instructions based on interpretation of the conversational input 210 by the end user as interpreted by system 100 to modify the markup language on the fly. The controller 225 delegates functions to one or more different systems, defines the performance to accomplish the specific request. In one embodiment, the controller 225 initiates guiding of each specific instruction to different controllers 275 that are in charge of diverse systems for specific purposes, e.g., retrieving specific types of data from local content storage and/or content generation systems and/or from outside services. In one embodiment, the controller 225 passes through the key data for each content controller. The different controllers 275 that may be activated to generate the content for the document may, in one embodiment, include but are not limited to, API controller 260, a data functions controller 262, a visualizations controller 264, an iframe controller 266, a database controller 268 or any other type of controller 270 that can be used to provide a type of content for the user's visualization.

In one embodiment, these sub-controllers handles a specific task in the whole system. For example, after the conversation resolves with a "Exchange Rate" intent, and with the entity "Currency" equal to "EUR". The Main-Controller would then execute a function that tags the operation as "ExchangeRate" and passes through the relevant metadata which would be "Currency: EUR" and "ComparisonCurrency: USD" to the Data Controller 225.

In this example embodiment, the "ComparisonCurrency" variable was not taken from the ACA but it was set up by the ACA based on the fact that the user didn't suggest a second currency.

The data-controller sub-system then formats the data appropriately and constructs the object needed by the API-controller which then selects the correct API address and fires off the query. A fail or success response will return, and then the API-controller will relay that to the Response Handler system 230. Depending on the query response, whether it was successful or there was any errors, the system will respond back appropriately to the main ACA control module.

As shown in FIG. 2, the provision or relay of orders or instructions by the ACA module 15 happen in parallel to the output to the end user and are handled by an array of systems 275 for different purposes. In a non-limiting embodiment, an order may invoke operations including, but not limited to, for example: 1) General behaviour control, e.g., determining which component should be on the foreground; 2) Data filtering, e.g., returning specific data from the database based on user input; 3) Visualization Control, e.g., modifying the markup language to show interactive visualizations; 4) Dashboard Control, e.g., replacing the foreground smoothly with the corresponding dashboard; and 5) Prediction Generation, e.g., calculating predictions based on user input.

As an example use scenario, if an end user is just interested in plain data and during the conversation, the automated conversational agent 150 detects this intent, the ACA data controller 225 will send an instruction 265 to the system processor in charge of communicating with a database, for example, to return the data that matches the intent based on the context of the conversation. Once that answer is returned, the system 100 modifies on the fly the markup language document to show the user the answer and continue the conversation.

As another example, if the end user wants to interact with data and this intent is detected by the automated conversational agent module 150, then different systems would be activated, including but not limited to one system to return the pertinent data as an object 280 and pass it through to another system such as visualization controller 264 that may be in charge of a visualization engine. This engine would modify the markup language document to include one or more interactive visualizations based on the data that was passed. In such an embodiment, the relevant data that is needed to satisfy the user request is returned as an object, such as an object 280 received from the database controller.

While the data controller activates the various sub-system controllers to provide the relevant content for the mark-up document, a further process is running at 230 to determine whether all the information is formatted in the mark-up for visualization by the user at the end user device. If it is determined that not all data has been provided, for reason that not enough context has been received for that particular requested information to be presented, the process returns to step 245, in order to modify the conversational flow in an effort to elicit more information from the user for which context or intent is determinable. Then the loop provided by running steps 205 through 230 steps will repeat until such time as the error handler 230 determines that all data has been successfully received at 235 and that the requested data/information may be visualized for the end user. Upon determination at 235 that all data and formatting preferences has been successfully received by the data controller, the process proceeds to 240 where the ACA agent determines which components are to be used to render, in real time, the document for presentation at the end user device. In one embodiment, the document modifier module is run at one or more system processors 152A, 152B to retrieve the required components from a component pool 250, which components are used to render the document with the requested data for return to the user. For example, plural DOM tags may be inserted in the markup language and/or style sheet mutations may be programmed. In one example, component pool 250 may include those DOM tags used for rendering in the document data including, but not limited to: plain text, maps, tables, graphs, charts, graphics, titles, headers, paragraphs, text properties, visualizations and links to other documents.

In one embodiment, the markup language document is a predetermined template and the control processor response determines which, if any, components are to be added to the template document for use in providing the visualization, and which components can be removed from the template document based on the determined intent.

In one embodiment, the Markup Language Document web page structure and content depends on how the DOM tags are distributed through the content and may include: markup language document (HTML) components, Cascading Style Sheets (CSS) components, and/or JavaScript® (JS) components. Based on the DOM elements, components are defined and may be grouped as data container elements. JavaScript® allows dynamic updates provided by its event-driven design that allows for frameworks and libraries to be used for diverse purposes. These may be focused on changing DOM content based on actions or events. JavaScript® provides the ability that allows components to be added or removed into the DOM dynamically based on the ACA module instructions.

In one embodiment, the ACA module 150 responds to end-user input based on pre-programmed routines determined by the intended use of the technology. In one embodiment, this is accomplished based on pre-programmed routines and improved as more interactions with the user are performed. The markup language and style sheet mutations would still be needed.

Returning to step 250, upon accessing the components used to mutate the markup language document, in real time, based on the conversational input (context, variables), the components are chosen and associated data is injected to the markup document at 252. In particular a new object 285 is generated that includes the requested data formatted according to the components determined based on the context and variables. For example, it may be detected that according to the determined intent, e.g., financial results, certain components would be required, e.g., a chart. These components (e.g., combination of DOM tags) may be added to a markup document, e.g., a template document. A component may include a visualization object with commands for rendering a dashboard at a suitable screen resolution depending on the end user device type. At 255, the controller process modifies the markup language document and transmits the requested information over a network for display on the same display screen at the end user device within which the user interacted with the ACA. In one embodiment, a visualization engine under control of visualization controller 264 may receive the object 280 and create another object 285 at 252 with the visualization generation information needed for the end user device 121, 122. Once displayed on the end user device interface, the process ends at 259 and may proceed back to step 205 to await/monitor any further conversation input by that end user.

Figure 3:
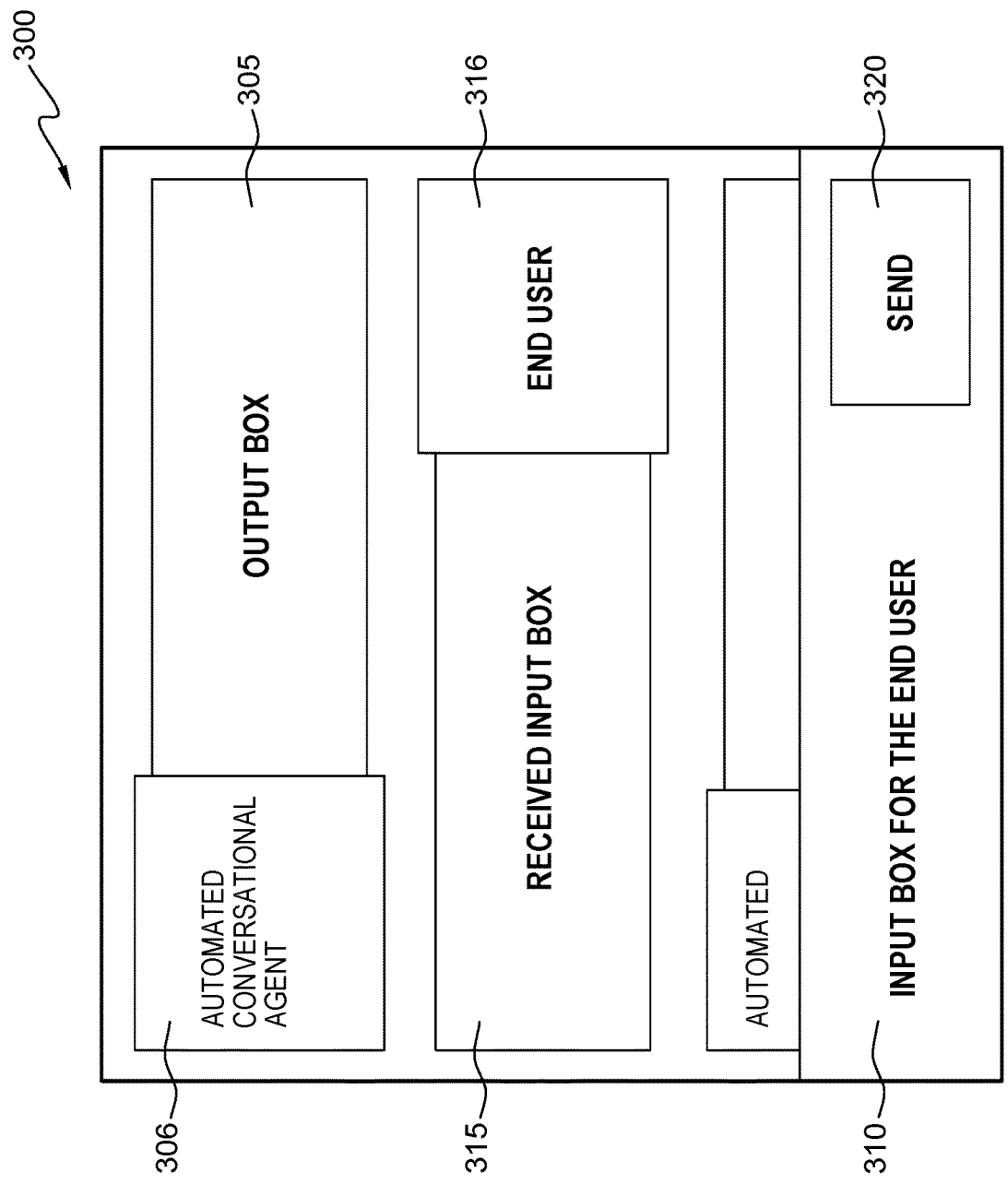
FIG. 3 depicts one example of an automated conversational agent interactive interface which is generated by the ACA module and provided for visualization via an end user device.

FIG. 3 depicts one example of an Automated Conversational Agent interactive interface 300 which is generated by the ACA module 150 and provided for visualization at end user devices, e.g., device 121, 122, The ACA 150 acts as an assistant to the end user. Via the ACA interface 300, system 100 is capable not only of understanding user inputs, but also of executing actions that have an immediate impact on the end user experience as described with respect to FIG. 2.

In a non-limiting example, as shown in FIG. 3, interface 300 is a dialog box displayed via browser on a user end device and includes an input box or field 305 within which the ACA communicates messages with the end user. A tag or icon 306 may be displayed in the interface to indicate the communication from the ACA 150 and used to prompt an end user response. The interface box 300 further shows an input box or input field 310 in which the user enters input relating to specific requests for data, dashboards, and/or any preference for visualizing the data or dashboards (i.e., conversational inputs). Upon entry of the received user inputs in field 310, the user may then select a "send" button 320 to initiate automatic sending of the request to the system 100 for processing of the conversational input by the ACA module 150. Once the inputs are successfully received at the ACA module 150 of system 100, the interface box 300 may be configured to display the most recent user input in a display field 315 showing that the system 100 received the user input. A tag or icon 316 associated with the end user 311 may be displayed in the interface 300 to indicate to the user that the system 100 has received the end user input and is being processed.

Figure 5A:
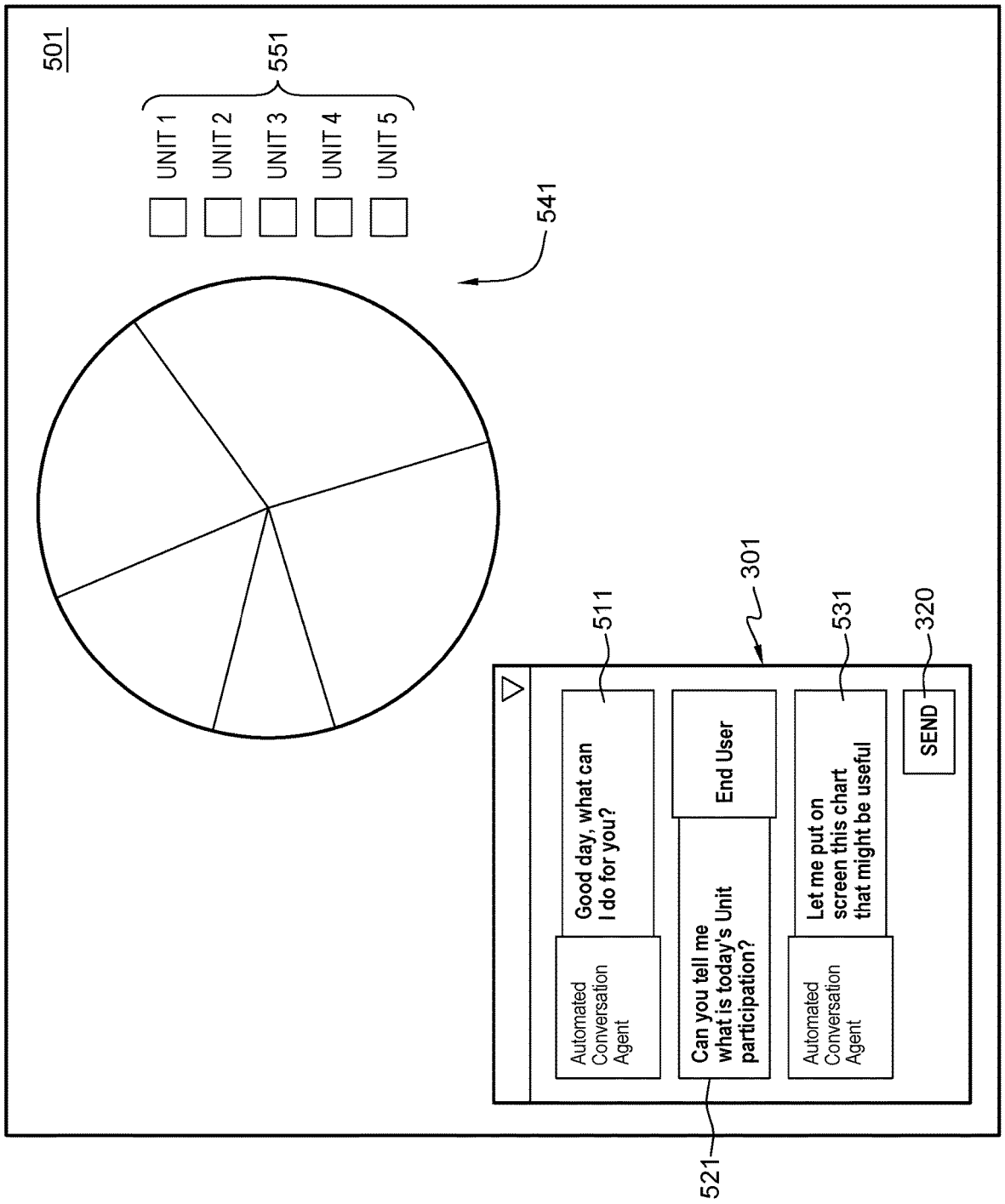
FIGS. 5A, 5B and 5C depict respective examples of user interaction with the ACA interface for real-time rendering of documents specifically tailored for a user based on a user context determined from the user's successive conversational inputs in one embodiment.
Figure 5B:
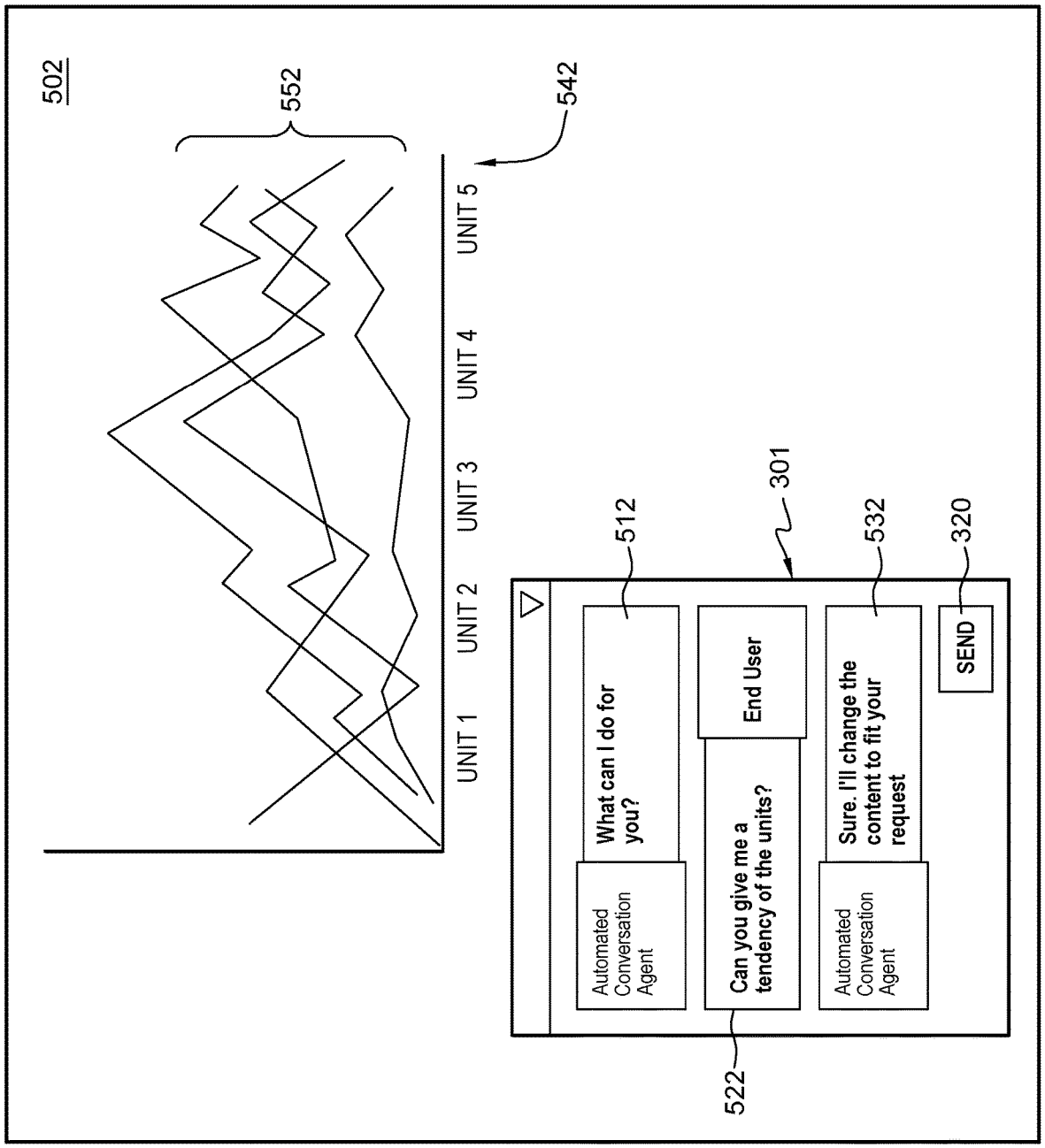
Figure 5C:
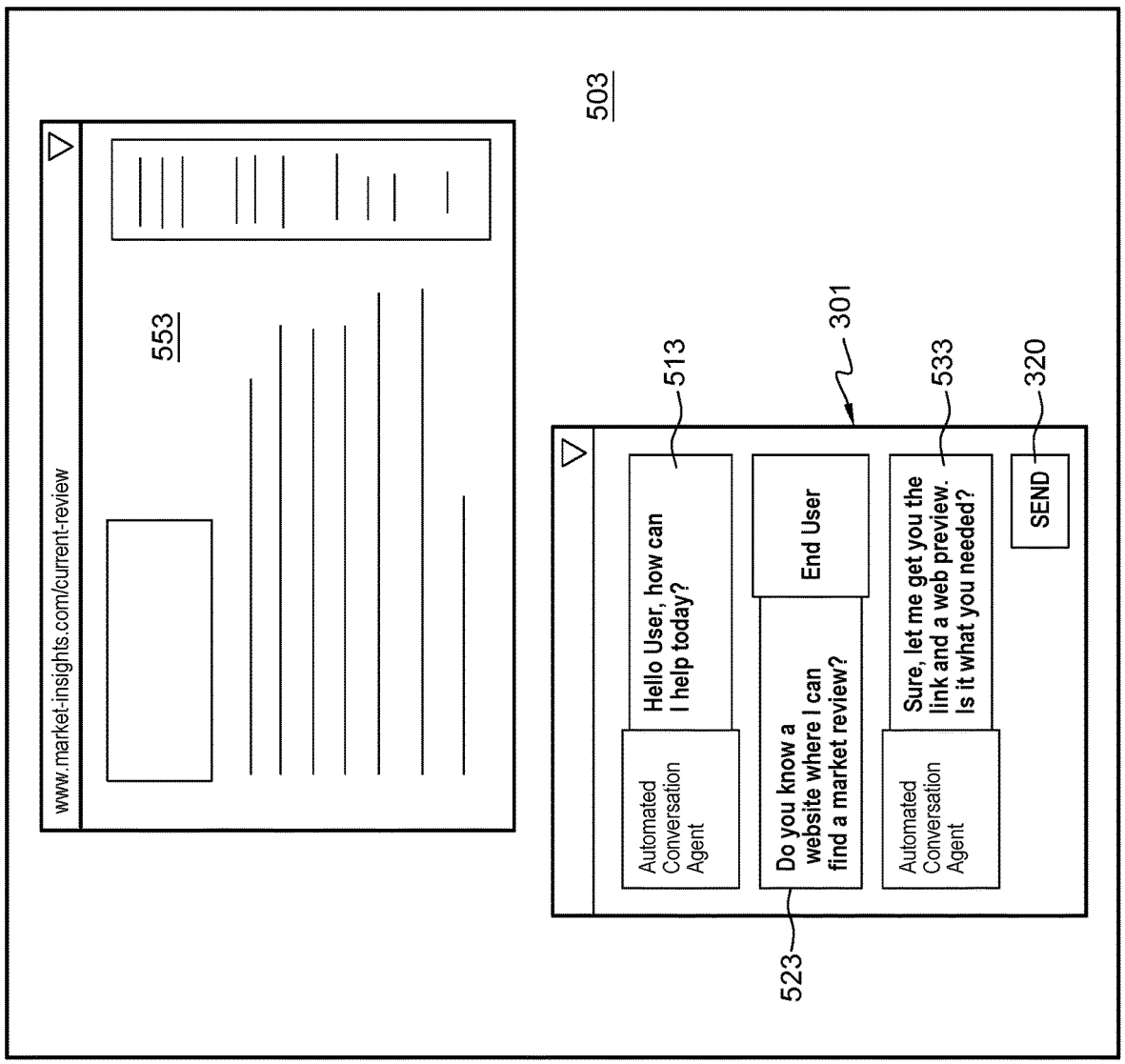

FIGS. 5A, 5B and 5C depict respective examples of a user's interaction with the ACA interface for real-time rendering of documents specifically tailored for the user based on a user's context determined from the user's successive conversational inputs in one embodiment.

For example, as shown in FIG. 5A, upon invoking the automated cognitive conversational agent functionality, a conversational agent dialog box 301 may be presented to an end user device screen display interface 501 for receiving conversation interaction/input. Initially, conversational agent dialog box 301 present to the end user an introduction message in the ACA field 511. The end user, as an example response, may request a specific function and enter conversation in the form of a query or request 521. For example, as shown in FIG. 5A, the request may be "Can you tell me what is today's Unit participation?" and the end user will press the send button 320 to enter and initiate processing of the request at system 100. Using the methods of FIG. 2, the system 100 will obtain and generate for display via the end user's browser display 501 the recommended content 541, e.g., the participating units 551. As shown, the methods run by the ACA module will generate the display 541 according to a determined user context, e.g., as a pie chart segmented according to the requested data. The ACA module may respond to the user via display/entry field 531 informing the user that the requested display is in a chart form, and thought to be useful for the end user given the current context.

Continuing with the example of FIG. 5A, the end user further would like to see a summary of the requested units displayed as a line chart. Thus, after rendering the document displayed in FIG. 5A, the automated cognitive conversational agent dialog box 301 may further request what the system 100 can do for the end user via display field 512 shown in FIG. 5B. In response, via the automated cognitive conversational agent dialog box 301 presented on the end user device screen display interface 502, the end user may request a specific function based on the data previously presented and enter this as conversation in the form of a query or request 522. For example, as shown in FIG. 5B, the request may be "Can you give me a tendency of the units?" and the end user will press the send button 320 to enter and initiate processing of the request at system 100. Using the methods of FIG. 2, the system 100 will obtain and generate for display via the end user's browser display 502 the same recommended content, however, showing the participating units as line graphs 552 plotted over time for the respective units. As shown, the methods run by the ACA module will generate the display 542 according to a determined user context, e.g., interpreting the word "tendency" of the units as meaning line charts showing the requested units' participation over time. The ACA module may respond to the user via display/entry field 532 informing the user that the system has changed the content to line view in accordance with the most recent interaction.

As a further example, as shown in FIG. 5C, upon invoking the automated cognitive conversational agent functionality, a conversational agent dialog box 301 may be presented to an end user device screen display interface 503 for receiving conversation input. Initially, conversational agent dialog box 301 presents to the end user an introduction message in the ACA field 513. The end user, as an example response, may request a specific function and enter conversation in the form of a query or request 523. For example, as shown in FIG. 5C, the request may be "Do you know a website where I can find a market review?" and the end user will press the send button 320 to enter and initiate processing of the request at system 100. Using the methods of FIG. 2, the system 100 will obtain and generate for display via the end user's browser display 503 the recommended content, e.g., an iframe 553 of the requested website showing the URL "www.market-insghts.com/current-review". As shown, the methods run by the ACA module will generate the iframe display 553 according to a determined user context, e.g., this current user (or other users) in the past may have requested this website for similar purpose. The ACA module may respond to the user via display/entry field 533 informing the user that the system has retrieved the link and provided a web preview. It may further request that the user verify that the request has been satisfied, or whether the end user needs anything else.

In a further aspect, the present invention may be integrated into a current IBM Bluemix® Conversation API for making end user interaction with data and systems easier for the end user.

Figure 8:
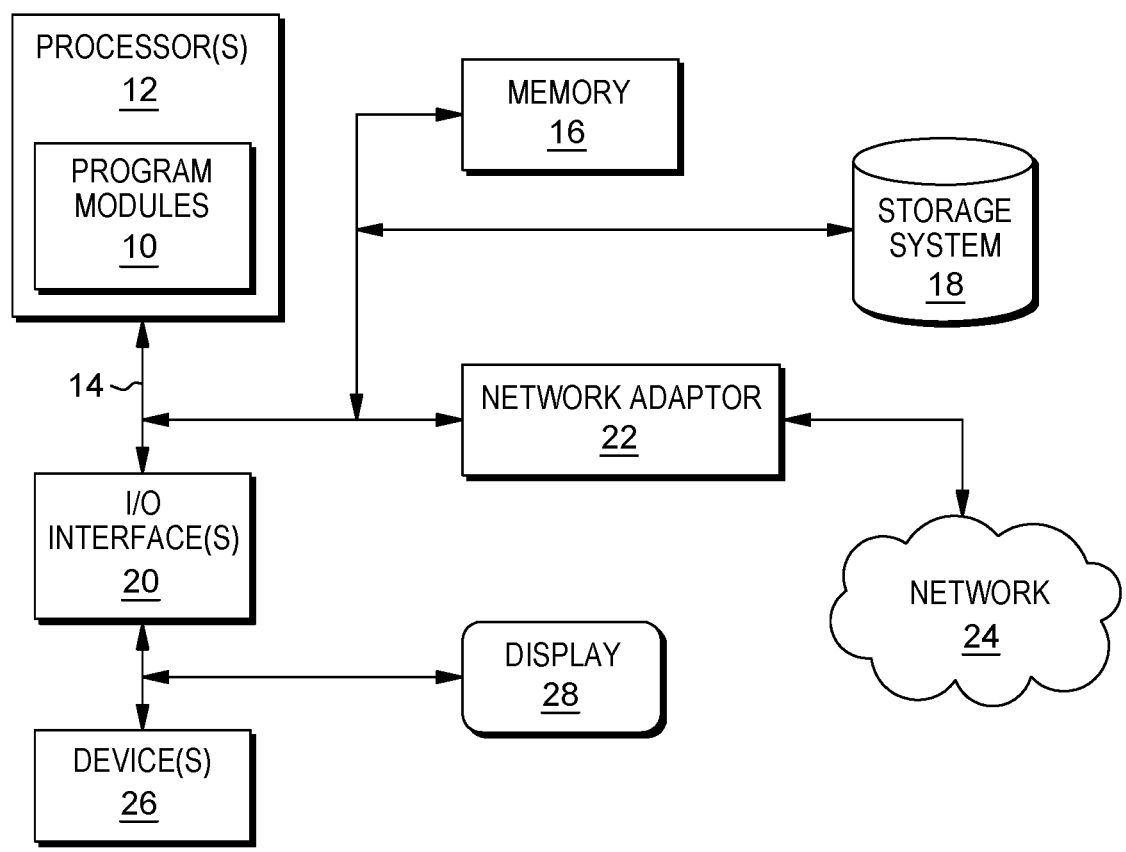
FIG. 8 depicts an exemplary system in accordance with embodiments of the present invention.

FIG. 8 illustrates an example computing system in accordance with the present invention. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present system and methods (see e.g., FIGS. 1-3).

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to:

microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In one embodiment, a computing system, environment, and/or configuration that may be suitable for use with the system shown in FIG. 1 includes a cloud computing environment.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
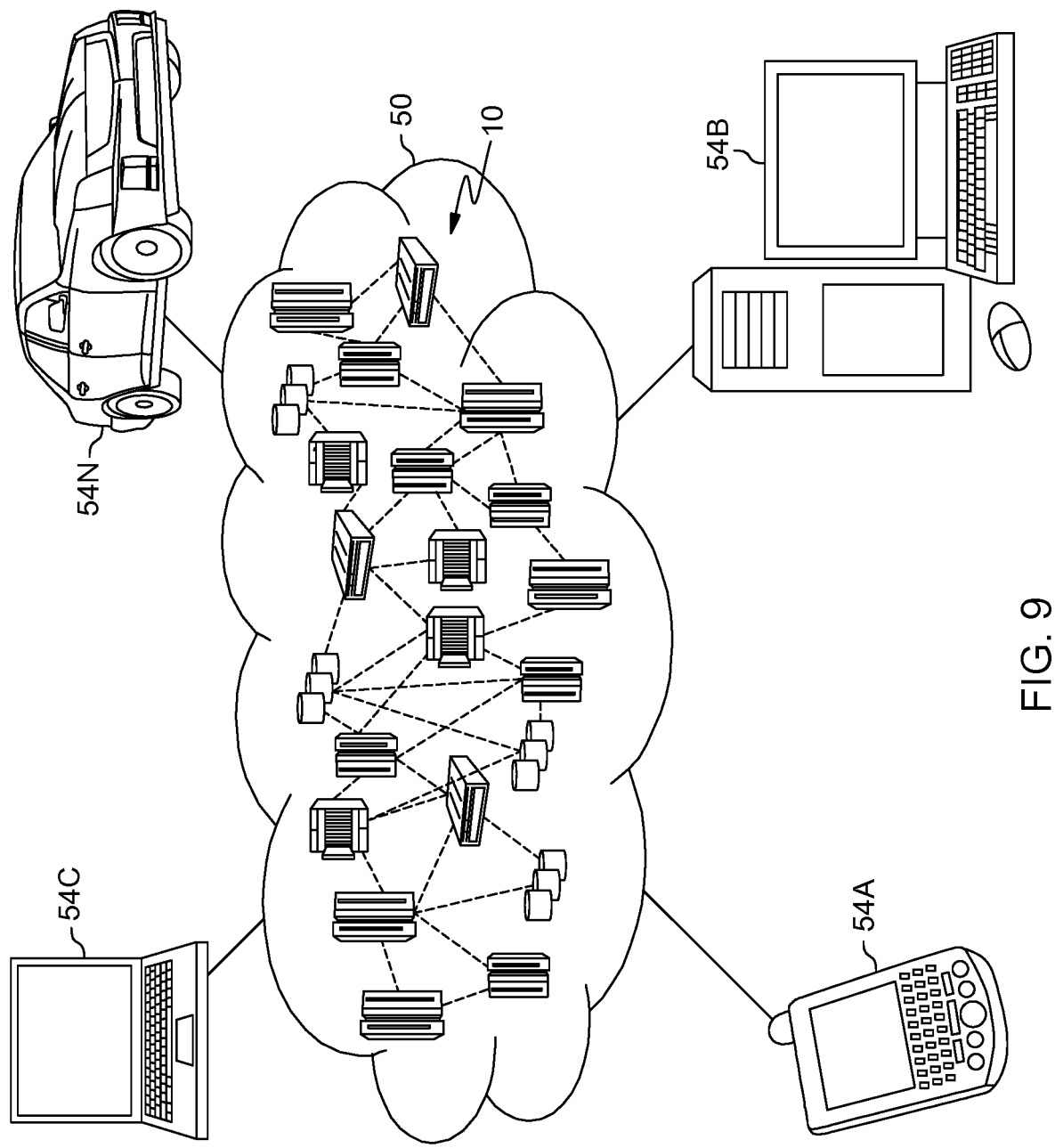
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 1000 with which local computing devices used by cloud consumers, such as, for example, personal digital assistant (PDA) or cellular telephone 54A, desktop computer 54B, laptop computer 54C, and/or automobile computer system 54N may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 1000 and cloud computing environment 50 can communicate with any type of computerized device over any type of network and/or network addressable connection (e.g., using a web browser).

Figure 10:
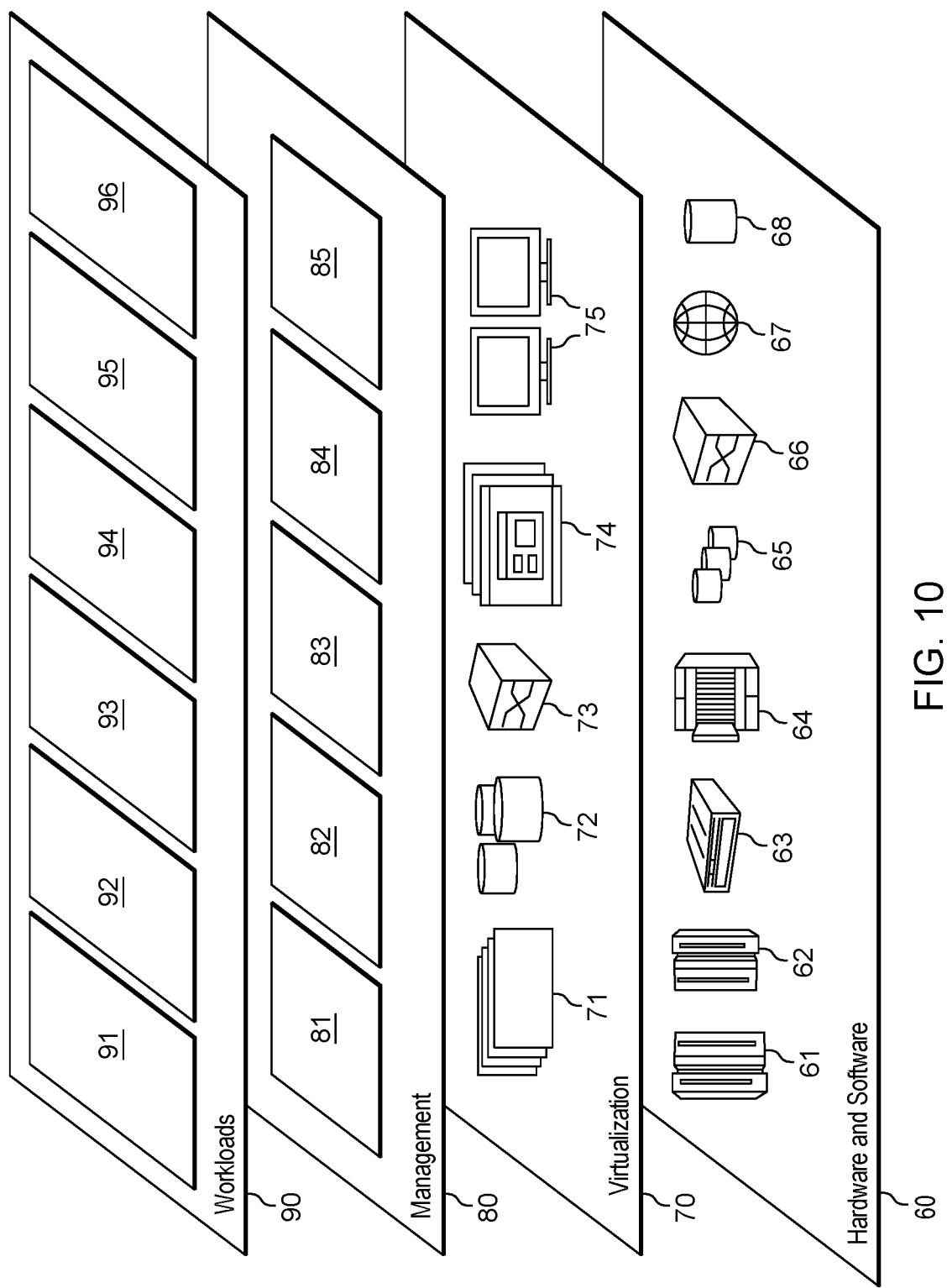
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the cognitive conversational agent processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing a mark-up language document in real-time, the method comprising:
   receiving, at a control processor, text input associated with a conversation initiated by a user interacting with a conversational dialog input via a device interface;
   generating, using the control processor, a set of variables associated with a context of said user based on a conversation flow;
   identifying, using the control processor, a data use intent of the user based on the set of variables and the user context, said identifying a data use intent of the user comprising running, by the control processor, a cognitive machine learning model trained to correlate a series of identified variables associated with a current conversation flow with a respective intent and a corresponding visualization outcome;
   determining, using the control processor, based on the identified data use intent, a required visualization outcome of data for presentation via a device display screen using the mark-up language document;
   in response to determining the required visualization outcome of data, said control processor obtaining a relevant data or information to be visualized for said presentation;
   retrieving, by the control processor, one or more visualization objects from a pool of stored visualization objects, each stored visualization object prefabricated with one or more tag elements providing instructions of how to modify the mark-up language document in a manner that renders a visual appearance of graphic objects, a text type, and a text characteristic of the obtained relevant data or information to be visualized for said presentation via the display screen according to the determined required visualization outcome;
   modifying, by the control processor, in real time, the mark-up language based document using said one or more visualization objects retrieved from said pool; and
   transmitting the modified markup language based document including the one or more visualization objects for display via the device display screen.

2. The method of claim 1, further comprising:
   receiving audio or spoken input from an end user device, said converting a spoken conversation using a speech to text converter to obtain said associated text input.

3. The method of claim 1, further comprising:
   parsing, by said processor, said text input of said conversation and identifying keywords;
   generating, by said control processor, an index or score on each identified keyword;
   matching, by said processor, a keyword to a corresponding variable based on said index or score; and
   repeating the generating of a score for each identified keyword and the matching of the keyword to a corresponding variable to obtain said set of variables per conversation flow.

4. The method of claim 1, wherein said markup language document is a predetermined template of a markup language webpage, said method further comprising:
   deciding, by said control processor, whether to push a specific visualization object into the markup language document, or remove one or multiple components from the markup language document.

5. The method of claim 4, wherein said visualization object comprises one or more document object model (DOM) hypertext mark-up language (HTML) tags for displaying relevant data and information at the device interface.

6. The method of claim 1, wherein said obtaining a relevant data or information to be visualized comprises:
 delegating, by said control processor, based on the set of variables, a specific instruction to each of one or more different control engines that are in charge of retrieving specific types of data or information from at least one of: a local content data storage system and a third party service that handles data from a remote content storage system; and
 receiving, by said control processor, a further object including the requested data or information to be visualized from a respective different control engine.

7. The method of claim 1, wherein said generating a set of variables associated with a context of said user based on a conversation flow further comprises:
 generating, by said control processor, a communication to said end user requesting additional data or information for populating a variable of said set of variables based on a conversation flow.

8. A cognitive computer system for managing a mark-up language document in real-time, said system comprising:
 a memory storage system storing program instructions;
 a control processor for running the stored instructions to configure the control processor to:
 receive text input associated with a conversation initiated by a user interacting with a conversational dialog input via a device interface;
 generate a set of variables associated with a context of said user based on a conversation flow;
 identify a data use intent of the user based on the set of variables and the user context, wherein to identify a data use intent of the user, the control processor runs a cognitive machine learning model trained to correlate a series of identified variables associated with a current conversation flow with a respective intent and a corresponding visualization outcome;
 determine based on the identified data use intent, a required visualization outcome of data for presentation via a device display screen using the mark-up language document;
 in response to determining the required visualization outcome of data, obtain a relevant data or information to be visualized for said presentation;
 retrieve one or more visualization objects from a pool of stored visualization objects, each stored visualization object prefabricated with one or more tag elements providing instructions of how to modify the mark-up language document in a manner that renders a visual appearance of graphic objects, a text type, and a text characteristic of the obtained relevant data or information to be visualized for said presentation via the display screen according to the determined required visualization outcome;
 modify, in real time, the mark-up language based document using said one or more visualization objects retrieved from said pool; and
 transmit the modified markup language based document including the one or more visualization objects for display via the device display screen.

9. The system of claim 8, wherein said control processor is further configured to:
 receive audio or spoken input from an end user device; and
 convert, using a speech to text converter, said spoken conversation to said associated text input.

10. The system of claim 8, wherein said control processor is further configured to:
 parse said text input of said conversation and identifying keywords;
 generate an index or score on each identified keyword;
 match a keyword to a corresponding variable based on said index or score; and
 repeat the generating of a score for each identified keyword and the matching of the keyword to a corresponding variable to obtain said set of variables per conversation flow.

11. The system of claim 8, wherein said markup language document is a predetermined template of a markup language webpage, said control processor is further configured to:
 decide whether to push a specific visualization object into the markup language document, or remove one or multiple components from the markup language document, said visualization object comprising one or more document object model (DOM) hypertext mark-up language (HTML) tags for displaying relevant data and information at the device interface.

12. The system of claim 8, wherein to obtain a relevant data or information to be visualized, said control processor is further configured to:
 delegate, based on the set of variables, a specific instruction to each of one or more different control engines that are in charge of retrieving specific types of data or information from at least one of: a local content data storage system and a third party service that handles data from a remote content storage system; and
 receive a further object including the requested data or information to be visualized from a respective different control engine.

13. The system of claim 8, wherein to generate a set of variables associated with a context of said user based on a conversation flow further comprises:
 generate a communication to said end user requesting additional data or information for populating a variable of said set of variables based on a conversation flow.

14. A computer program product comprising a non-transitory computer readable storage medium having program instructions embodied therewith, the program instructions executable by a computer to perform a method for managing a displayed mark-up language document in real-time, the method comprising:
 receiving text input associated with a conversation initiated by a user interacting with a conversational dialog input via a device interface;
 generating a set of variables associated with a context of said user based on a conversation flow;
 identifying a data use intent of the user based on the set of variables and the user context said identifying a data use intent of the user comprising running, by the computer, a cognitive machine learning model trained to correlate a series of identified variables associated with a current conversation flow with a respective intent and a corresponding visualization outcome;
 determining based on the identified data use intent, a required visualization outcome of data for presentation via a device display screen using the mark-up language document;
 in response to determining the required visualization outcome of data, obtaining a relevant data or information to be visualized for said presentation;
 retrieving one or more visualization objects from a pool of stored visualization objects, each stored visualization object prefabricated with one or more tag elements providing instructions of how to modify the mark-up language document in a manner that renders a visual appearance of graphic objects, a text type, and a text characteristic of the obtained relevant data or information to be visualized for said presentation via the display screen according to the determined required visualization outcome;

modifying in real time, the mark-up language based document using said one or more visualization objects retrieved from said pool; and transmitting the modified markup language based document including the one or more visualization objects for display via the device display screen.

15. The computer program product of claim 14, wherein said method further comprises:

parsing, by said processor, said text input of said conversation and identifying keywords;

generating, by said control processor, an index or score on each identified keyword;

matching, by said processor, a keyword to a corresponding variable based on said index or score; and repeating the generating of a score for each identified keyword and the matching of the keyword to a corresponding variable to obtain said set of variables per conversation flow.

16. The computer program product of claim 14, wherein said method further comprises:

deciding whether to push a specific visualization object into the markup language document, or remove one or multiple components from the markup language document, wherein said visualization object comprises one or more document object model (DOM) hypertext mark-up language (HTML) tags for displaying relevant data and information at the device interface.

17. The computer program product of claim 14, wherein said obtaining a relevant data or information to be visualized comprises:

delegating, based on the set of variables, a specific instruction to each of one or more different control engines that are in charge of retrieving specific types of data or information from at least one of: a local content data storage system and a third party service that handles data from a remote content storage system; and receiving a further object including the requested data or information to be visualized from a respective different control engine.

* * * * *